(12) United States Patent
Yang et al.

(10) Patent No.: US 8,990,115 B2
(45) Date of Patent: Mar. 24, 2015

(54) METHOD, APPARATUS AND SYSTEM FOR IMPLEMENTING VERIFICATION AND PAYMENT IN CONTENT SERVICE

(75) Inventors: Yong Yang, Shenzhen (CN); Haifang Niu, Shenzhen (CN); Huifa Qiu, Shenzhen (CN); Yu Guo, Shenzhen (CN); Ming He, Shenzhen (CN); Xu Zhang, Shenzhen (CN); Zize Wan, Shenzhen (CN); Wengang Mo, Shenzhen (CN)

(73) Assignee: Tencent Technology (Shenzhen) Company Ltd., Shenzhen (CN)

(*) Notice: Subject to any disclaimer, the term of this patent is extended or adjusted under 35 U.S.C. 154(b) by 805 days.

(21) Appl. No.: 12/778,811

(22) Filed: May 12, 2010

(65) Prior Publication Data

US 2010/0280952 A1   Nov. 4, 2010

Related U.S. Application Data

(63) Continuation of application No. PCT/CN2008/073113, filed on Nov. 19, 2008.

(30) Foreign Application Priority Data

Dec. 4, 2007   (CN) .......................... 2007 1 0195222

(51) Int. Cl.
*G06Q 20/40* (2012.01)
*G06Q 40/00* (2012.01)
(Continued)

(52) U.S. Cl.
CPC .............. *G07F 17/32* (2013.01); *G06F 21/125* (2013.01); *G06Q 20/40* (2013.01)
USPC ............................................. 705/44; 717/176

(58) Field of Classification Search
CPC .......... G06Q 40/00; G06Q 20/40; G06F 8/61; G06F 9/445; G06F 17/32; G06F 21/125
USPC ..................... 705/44; 717/103, 171, 173, 176
See application file for complete search history.

(56) References Cited

U.S. PATENT DOCUMENTS 7,346,669 B2 * 3/2008 Anderson ..................... 709/219
7,565,647 B2 * 7/2009 Davidov et al. ............... 717/140
(Continued)

FOREIGN PATENT DOCUMENTS

CA   2543699 A1   10/2006
CA   2648617 A1   10/2007
(Continued)

OTHER PUBLICATIONS htt://XMalpha.com; "Jar Tool: Bundling Files"; 2006 WolfWare, Inc.; pp. 1-8.*
(Continued)

*Primary Examiner* — Ella Colbert
(74) *Attorney, Agent, or Firm* — Marshall, Gerstein & Borun LLP (57) ABSTRACT

A method for implementing verification and payment in content services includes: pre-configuring a payment-related interface between a content service provider and an instant messaging service provider; providing the payment-related interface in a function library providing the instant messaging service's login verification interface; modifying the function library and a first jar package including a content service program provided by the content service provider, which includes: injecting the login verification interface and the payment-related interface into the first jar package and configuring the login verification interface as to be called before the content service program is executed; and combining the modified first jar package and function library to form a second jar package, modifying the value of attributes originally belonging to the first jar package in the second jar package to make the modified value of the attributes reflect corresponding attributes of the second jar package.

4 Claims, 3 Drawing Sheets

(51) Int. Cl.
*G06F 9/445* (2006.01)
*G07F 17/32* (2006.01)
*G06F 21/12* (2013.01)

(56) References Cited

U.S. PATENT DOCUMENTS

| | | | | |
|---|---|---|---|---|
| 7,849,459 | B2* | 12/2010 | Burkhart et al. | 717/174 |
| 8,549,166 | B2* | 10/2013 | Oliver et al. | 709/232 |
| 2003/0131320 | A1* | 7/2003 | Kumhyr et al. | 715/536 |
| 2004/0093595 | A1* | 5/2004 | Bilange | 717/171 |
| 2004/0212485 | A1* | 10/2004 | Tajima et al. | 340/436 |
| 2004/0259626 | A1 | 12/2004 | Akram et al. | |
| 2006/0140144 | A1* | 6/2006 | Bruner et al. | 370/328 |
| 2007/0169041 | A1* | 7/2007 | Kojima et al. | 717/148 |

FOREIGN PATENT DOCUMENTS

| | | | | |
|---|---|---|---|---|
| CN | 1818958 | * | 8/2006 | G06Q 30/00 |
| CN | 1818958 A | | 8/2006 | |
| CN | 101169736 A | | 4/2008 | |
| EP | 817046 A2 | * | 1/1998 | G06F 9/46 |
| EP | 1564957 | * | 8/2005 | H04L 29/06 |
| WO | WO 02/41271 | * | 5/2002 | G07F 19/00 |
| WO | WO 02/057903 A2 | * | 7/2002 | G06F 9/00 |
| WO | WO-2006128019 A2 | | 11/2006 | |

OTHER PUBLICATIONS

Apple Inc.; "Developer: Jar Bundler User Guide"; 2003, 2009; pp. 1-20.*
Wassim Hani and Ayman I. Kayssi; "J2ME End-to-End Security for M-Commerce"; IEEE; 2003; pp. 1-6.*
Amir Herzberg; "Payments and Banking with Mobile Personal Devices"; ACM; May 2003, vol. 46, No. 1; pp. 1-6.*
Examination Report for Application No. GB1009625.3, dated Feb. 20, 2012.
International Preliminary Report on Patentability for Application No. PCT/CN2008/073113, dated Jun. 8, 2010.
International Search Report and Written Opinion for Application No. PCT/CN2008/073113, dated Mar. 5, 2009.
Office action from corresponding Canadian Application No. 2,706,739 dated Nov. 28, 2012.

* cited by examiner

METHOD, APPARATUS AND SYSTEM FOR IMPLEMENTING VERIFICATION AND PAYMENT IN CONTENT SERVICE

CROSS-REFERENCE TO RELATED APPLICATIONS

This is a continuation of International Application No. PCT/CN2008/073113, filed Nov. 19, 2008, which in turn claims the priority benefit of Chinese Patent Application No. 200710195222.3 filed Dec. 4, 2007, the entire respective disclosures of which are incorporated herein by reference.

FIELD OF THE INVENTION

The present invention relates to Internet techniques, and more particularly, to a method, an apparatus and a system for implementing verification and payment in a content service.

BACKGROUND OF THE INVENTION

With the popularization of network applications, various content services such as online games are developing rapidly. In particular, various kinds of online games run on cell phones have attracted people's eyes due to their conveniences.

Some online games may be associated with an instant messaging account of a user. As such, the user is able to participant in the online games using the instant messaging account. For example, the instant messaging account may be a QQ number widely used at present. Thus, the user may participant in the game using the QQ number and may trade in the game using q coins provided by QQ.

In the above scenario, cooperation between an instant messaging (such as QQ, etc.) provider and an online game provider is required. At present, the cooperation manner of them is as follows: a cooperator provides a jar package and a jad package of a game program, wherein the jar package includes the game program and the jad package includes a description file for the game program. The QQ service provider provides a jar package for identity verification and trade-related operations (such as buy q coins, etc.), wherein the jar package includes a verification and payment program. The two jar packages are combined in series. The game program and the verification and payment program respectively in the two jar packages are independent from each other. They are just encapsulated in the same package for distribution. Herein, the cooperator may be a Content Provider (CP). In this example, the content service provided by the CP is an online game service. Therefore, the cooperator in this example refers to the online game service provider.

The user installs the combined package in the cell phone. After running the package, there will be two midlets (corresponding to two running programs) on the user's cell phone: a first midlet for performing verification and payment operations and a second midlet for performing game operations. That is to say, the verification and payment procedures cannot be performed when the game is running. Before playing the game using the QQ number, the user needs to log in through the first midlet to perform identity verification firstly. After the verification succeeds, the user quits from the first midlet and enters into the second midlet to begin the game. When playing the game, if the user desires to perform payment operations, e.g. buy q coins, the user has to quit from the second midlet (i.e. quit from the game) firstly, then enters into the first midlet to perform the operations of buying the q coins.

SUMMARY OF THE INVENTION

Embodiments of the present invention provide a method, an apparatus and a system for implementing verification and payment in a content service, so as to ensure operation security, simplify user's operation and make games more interactive.

According to one embodiment of the present invention, a method for implementing verification and payment in a content service is provided. The method includes:

pre-configuring a payment-related interface between a content service provider and an instant messaging service provider, providing the payment-related interface in a function library, wherein the function library further provides a login verification interface of the instant messaging service;

modifying the function library and a first jar package including a content service program which is provided by the content service provider, wherein the modification includes: injecting the login verification interface and the payment-related interface provided in the function library into the first jar package, and configuring the login verification interface as to be called before the content service program is executed; and, combining the modified first jar package and the modified function library to form a second jar package, modifying the value of an attribute in the second jar package which originally belongs to the first jar package to make the modified value of the attribute reflect a corresponding attribute of the second jar package.

According to another embodiment of the present invention, an apparatus for injecting an application program is provided. The apparatus includes: a receiving unit, an embedding unit and a combining unit; wherein:

the receiving unit is adapted to receive a function library and a first jar package which contains a content service program provided by a content service provider, provide the function library and the first jar package to the embedding unit, wherein the function library provides a payment-related interface pre-configured between the content service provider and an instant messaging service provider and further provides a login verification interface of the instant messaging service;

the embedding unit is adapted to modify the first jar package and the function library received from the receiving unit, wherein the modification includes: injecting the login verification interface and the payment-related interface provided by the function library into the first jar package, configuring the login verification interface as to be called before the content service program is executed; and the embedding unit is further adapted to provide the modified first jar package and the modified function library to the combining unit; and, the combining unit is adapted to combine the modified first jar package and the modified function library received from the embedding unit to form a second jar package, modify a value of an attribute in the second jar package which originally belongs to the first jar package to make the modified value of the attribute reflect a corresponding attribute of the second jar package.

According to still another embodiment of the present invention, a system for generating an application program is provided. The system includes: a content service program providing apparatus, a function library providing apparatus and an apparatus for injecting an application program; wherein:

the content service program providing apparatus is adapted to generate a first jar package containing a content service program provided by a content service provider, and provide the first jar package to the apparatus for injecting the application program;

the function library providing apparatus is adapted to pre-configure a payment-related interface between the content service provider and an instant messaging service provider, generate a function library, and provide a payment-related interface and a login verification interface of the instant messaging service in the generated function library; and, the apparatus for injecting the application program is adapted to modify the first jar package from the content service program providing apparatus of the content provider and the function library from the function library providing apparatus, wherein the modification includes: injecting the login verification interface and the payment-related interface provided by the function library into the first jar package, configuring the login verification interface as to be called before the content service program is executed, combining the modified first jar package and the modified function library to form a second jar package, modifying a value of an attribute in the second jar package which originally belongs to the first jar package to make the modified value of the attribute reflect a corresponding attribute of the second jar package.

In the technical solution provided by the embodiments of the present invention, a payment-related interface is configured in advance. And a login verification interface and the payment-related interface are provided in a function library (such as a Lib library). A first jar package provided by the cooperator for providing an application program (such as a game program) is obtained. The first jar package and the function library are modified so that the login verification interface and the payment-related interface provided in the function library are embedded into the first jar package. As such, verification and payment operations may be performed during runtime of the content service's program, which makes the content service more interactive. Meanwhile, the login verification interface is configured to be called before the content service program is executed, so as to ensure that the identity verification of a user may be performed firstly. Thus, the operation security may be ensured. Finally, the modified first jar package is combined with the modified function library to form a second jar package. And the attribute of the second jar package corresponding to the first jar package is modified to form a complete game distribution package. Through the above solution, it is possible to perform verification and payment operations in the content service. And the verification operation is performed automatically when the content service starts to run. Thus, the operation security is ensured, the user's operations are simplified and the content service becomes more interactive.

DETAILED DESCRIPTION OF THE INVENTION

The present invention will be described in detail hereinafter with reference to accompanying drawings and embodiments to make the technical solution and merits therein clearer.

The inventor of the present invention finds out that, the existing combination manner of the instant messaging service with the online game has the following deficiencies:

Application As Filed-30952/45285ing and test workload is rather huge.

In the technical solution provided by the embodiments of the present invention, a program which provides verification and payment functions is injected in a jar package provided by the cooperator (such as an online game provider or other content providers), so as to implement the verification and payment functions in the content service. In particular, on one hand, through modifying a processing logic of the jar package provided by the cooperator, a payment-related interface and a verification-related interface in a function library are injected into the jar package provided by the cooperator, and on the other hand, a calling interface of the function library is modified and relevant attribute information in the jar package provided by the cooperator is also modified.

The cooperator in the present invention refers to a Content Provider (CP). Currently, the most popular content service on the Internet is Online Game service. In the following embodiments, the online game service is taken as an exemplary content service for describing the technical solution of the present invention. But the content service in the present invention is not limited to the online game service.

In addition, the function library in the embodiments of the present invention may be provided by an instant messaging server or a third party, which is not restricted in the present invention.

Figure 1:
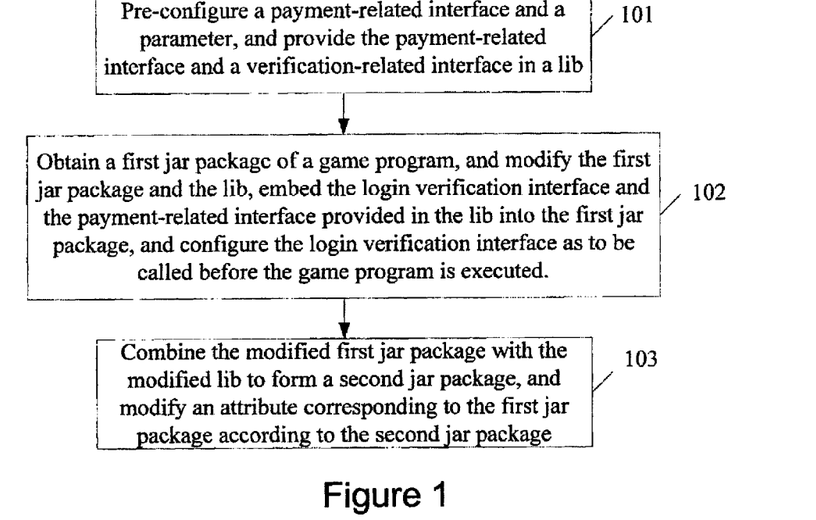
FIG. 1 is a general flowchart illustrating a method for automatically performing verification and payment during runtime of a game according to an embodiment of the present invention.

FIG. 1 is a general flowchart illustrating a method for automatically performing verification and payment during runtime of a game according to an embodiment of the present invention. As shown in FIG. 1, the method includes:

In Step 101, configure a payment-related interface and a parameter of the payment-related interface in advance, and provide the payment-related interface and a verification-related interface in a function library, wherein the verification-related interface may include: a login verification interface and other verification-related interfaces.

In the embodiment of the present invention, the function library may be a Lib library (Those skilled in this art can understand that the Lib library is a library with functions being packaged into). It may consist of programs related to verification and payment in a service program such as QQ.

In Step 102, obtain a first jar package of a game program provided by a cooperator, and modify the first jar package and the Lib library. The modification includes: embed the login verification interface and the payment-related interface provided in the Lib library into the first jar package, modify a calling interface in the Lib library at the same time, and configure the login verification interface as to be called before the game program is executed.

The step of injecting the login verification interface and the payment-related interface provided in the function library into the first jar package and configuring the login verification interface as to be called before the content service program is executed, may include: configuring a payment-related function in the first jar package as to call the payment-related interface, resetting a start function for calling the content service program in the first jar package as to call the login verification interface provided by the function library, creating a new assistant start function for calling the content service program in the first jar package, and modifying a function for calling the start function in the function library as to call the assistant start function.

In Step 102, each payment-related interface configured in step 101 is embedded in the first jar package, which ensures that verification and payment operations may be performed during runtime of the game. Thus, the game becomes more interactive. In addition, through calling the login verification interface firstly, it is ensured that the identity verification operation of the user may be performed before the running of the game.

In Step 103, combine the modified first jar package with the modified Lib library to form a second jar package, and modify an attribute in the second jar package which originally belongs to the first jar package according to the second jar package. As such, the value of the attribute in the second jar package which originally belongs to the first jar package can reflect the attribute of the second jar package. For example, modify an information file MANIFEST.MF, the size of a jad file or other parameters.

In this step, through combining the modified first jar package with the modified Lib library to form the second jar package, it is ensured that the interfaces embedded in the first jar package may be correctly called, so as to generate a complete cooperative game jar package. At the same time, as described above, the content of the first jar package is modified and the second jar package is formed. Thus, an attribute corresponding to the second jar package is required. Such attribute may be obtained through modifying the value of the attribute currently in the second jar package which originally belongs to the first jar package. Thus, a complete game package to be distributed, when the instant messaging service is combined with the online game, is generated.

Now, the general procedure of the method provided by the embodiment of the present invention is finished.

Figure 2:
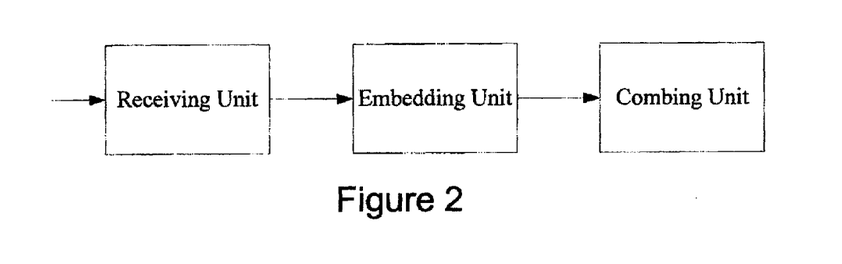
FIG. 2 is a schematic diagram illustrating a general structure of a game package injecting apparatus for automatically performing verification and payment during runtime of a game according to an embodiment of the present invention.

Embodiments of the present invention also provide an apparatus for injecting an application program. In the embodiments of the present invention, the apparatus for injecting an application program is adapted to realize automatic verification and payment during runtime of a game. In this embodiment of the present invention, it is also called as a game package injecting apparatus. FIG. 2 shows a general structure of the apparatus. As shown in FIG. 2, the apparatus includes: a receiving unit, an embedding unit and a combining unit.

In the apparatus, the receiving unit is adapted to receive a function library (which is a Lib library in this embodiment) and a first jar package provided by a cooperator, the first jar package being used for providing a game program, and provide the Lib library and the first jar package to the embedding unit, wherein the Lib library provides a verification-related interface (which includes at least a login verification interface) and a pre-configured payment-related interface.

The embedding unit is adapted to modify the first jar package and the Lib library received from the receiving unit, which includes: embedding the verification-related interface and the payment-related interface provided in the Lib library into the first jar package, modifying a calling interface in the Lib library, configuring the login verification interface in the verification-related interface as to be called before the game program is executed, and to provide the modified first jar package and the modified Lib library to the combining unit.

The combining unit is adapted to combine the first jar package and the Lib library modified by the embedding unit to form a second jar package, modify an attribute in the second jar package which originally belongs to the first jar package according to the second jar package. Thus the value of the attribute in the second jar package which originally belongs to the first jar package can reflect the attribute of the second jar package.

Figure 3:
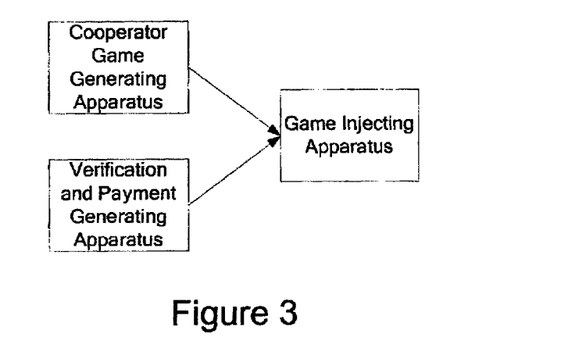
FIG. 3 is a schematic diagram illustrating a general structure of a game package generating system according to an embodiment of the present invention.

Based on the game package injecting apparatus shown in FIG. 2, embodiments of the present invention also provide an application program generating system when the online game is combined with the instant messaging service. FIG. 3 is a schematic diagram illustrating a general structure of the system. As shown in FIG. 3, the system includes: a content service program providing apparatus, a function library providing apparatus and an apparatus for injecting an application program. In the embodiment of the present invention, the content provider (also called as the cooperator) refers to an online game service provider, and the content service program refers to a game package (i.e., a first jar package) which provides the online game program. The function library is mainly used for providing the verification and payment interface. And the apparatus for injecting an application program is adapted to implement automatic verification and payment during runtime of the game. Therefore, in the embodiment of the present invention, the application program generating system may also be called as a game package generating system, the content service program providing apparatus may also be called as a cooperator game generating apparatus, the function library providing apparatus may also be called as a verification and payment generating apparatus, and the apparatus for injecting an application program may also be called as a game package injecting apparatus or a game injecting apparatus.

The cooperator game generating apparatus is adapted to generate a first jar package and a jad package which provide the game program of the cooperator, and provide the first jar package and the jad package to the game package injecting apparatus.

The verification and payment generating apparatus is adapted to configure a payment-related interface and a parameter in advance, generate a Lib library, and provide in the Lib library the payment-related interface and a verification-related interface which includes at least a login verification interface.

The game package injecting apparatus is adapted to modify the first jar package and the jad package from the cooperator game generating apparatus, where, the modification includes: embedding the login verification interface and the payment-related interface provided in the Lib library of the verification and payment generating apparatus into the first jar package, modifying a calling interface in the Lib library, and configuring the login verification interface as to be called before the game program is executed, to combine the modified first jar package and the modified Lib library to form a second jar package, and to modify an attribute in the second jar package which originally belongs to the first jar package according to the second jar package, such that the attribute in the second jar package which originally belongs to the first jar package can reflect the attribute of the second jar package.

The above describes the method, apparatus and system provided by the embodiments of the present invention in general. Hereinafter, the method, apparatus and system provided by the embodiments of the present invention will be described in detail with reference to some instances.

Take the combination of the verification and payment functions provided by the QQ service program with the online game service as an example (i.e., the instant messaging service is the QQ service, and the cooperator is the online game provider). The detailed process of the method provided by the embodiment according to the system shown in FIG. 3 includes the following steps:

In Step 1, configure a payment-related interface and a parameter in advance, and provide them to the cooperator.

In this step, the configured payment-related interface and the parameter may includes: an interface and a parameter for buying q coins provided by the QQ service program, an interface and a parameter used for obtaining a QQ ID, and an interface and a parameter used for obtaining a session ID (SID).

After obtaining the pre-configured payment-related interface and the parameter, the cooperator may configure functions having the same name with the pre-configured payment-related interface in the game program. But the function bodies of the functions with the same name are null when the cooperator generates the game program (i.e., the game program in the first jar package).

In Step 2, the verification and payment generating apparatus generates a Lib library. The Lib library includes a verification interface (which includes at least a login verification interface) and the payment-related interface.

In this step, the Lib library may be generated utilizing a verification and payment jar package (e.g., a qqverifyFrame.jar package) provided in the QQ service program. The qqverifyFrame.jar package includes a login verification interface startQQverifyLogin( ) and the payment-related interface, and includes an interface startQQGame( ) used for returning to the game program through the jar package. The payment-related interface may include: a getQQId( ) interface for obtaining the QQ ID, a getSID( ) interface for obtaining the SID, and a buyQQGood( ) interface for buying the q coins.

In Step 3, the game package injecting apparatus receives the jar package containing the game program provided by the cooperator, In this step, the game package injecting apparatus receives the jar package (e.g., an OppFrame.jar package) provided by the cooperator. The OppFrame.jar package is the first jar package in the flowchart shown in FIG. 1. The OppFrame.jar package includes a start function StartApp( ) of the game program and null functions getQQId( ) getSID( ) and buyQQGood( ) which have the same names with the payment-related interface pre-configured in Step 1.

In Step 4, the game package injecting apparatus resets the start function in the OppFrame.jar package as to call the login verification interface in the Lib library, and creates a new assistant start function in the first jar package which is used for saving the content of the start function before the start function is reset.

In this step, the start function StartApp( ) is the function firstly started in the game program. Therefore, through modifying the start function as to call the startQQVerifyLogin( ), it is ensured that the user identity verification can be performed before the game program is executed. The calling of the startQQVerifyLogin( ) may be implemented by the following codes:

StartApp{qqverifyFrame.startQQVerifyLogin};

Since the content of the start function has modified, a new assistant start function StartAppOld( ) is created to save the implementation codes of the start function before it is reset. The detailed process may be implemented by the following codes:

StartAppOld{OppFrame.StartApp};

In Step 5, the game package injecting apparatus configures the payment-related function in the OppFrame.jar package as to call the payment-related interface provided by the Lib library.

As described above, the cooperator has configured functions which have the same names with the payment-related interface in the game program. The functions having the same names are referred to as payment-related functions. However, the function bodies of the payment-related functions are null. In this step, the payment-related functions are configured as to call the payment-related interface provided by the Lib library. As such, the payment-related interface may be called during the execution of the game program to implement the payment operations. The payment-related functions in the OppFrame.jar package may be configured as to call the payment-related interface provided by the Lib library by the following codes:

```
getQQId( ){return qqverifyFrame.getQQId( );}
getSID( ){return qqverifyFrame.getSID( );}
buyQQGood( ){return qqverifyFrame.buyQQGood( );}
```

Now, the modification to the first jar package, i.e., the OppFrame.jar package, is finished.

In Step 6, configure an interface of the start function in the OppFrame.jar package in the Lib library as to call the assistant start function.

In the qqverifyFrame.jar package, the start function StartApp( ) in the OppFrame.jar is called through the interface startQQGame for returning to the game program. Since the start function StartApp( ) has been modified in Step 4, if the startQQGame( ) still calls the start function StartApp( ), the modified StartApp( ) will be executed. Based on this, in this step, the startQQGame( ) is configured as to call the assistant start function StartAppold( ), i.e., the content of the start function before the start function is reset. Now, the modification to the Lib library is finished.

Through the above Steps 3-6, the game package injecting apparatus has finished the inter-embedding of the jar package of the game program (i.e., the first jar package) and the jar package of the verification and payment (i.e., the package of the Lib library) through modifying the content of the first jar package. In the following, Step 7 will be performed to combine the above modified first jar package with the modified Lib library to form a game package for distribution when the QQ service is combined with the online game. In Step 7, the modified first jar package is combined with the modified Lib library to form a second jar package. And the attribute in the second jar package which originally belongs to the first jar package is modified according to the second jar package, so that the value of the attribute in the second jar package which originally belongs to the first jar package can reflect the attribute of the second jar package.

In this step, the modified attribute includes: an information file MANIFEST.MF, the size of a jad file and other parameters. The modification may be performed according to existing methods, which will not be described herein.

Figure 4:
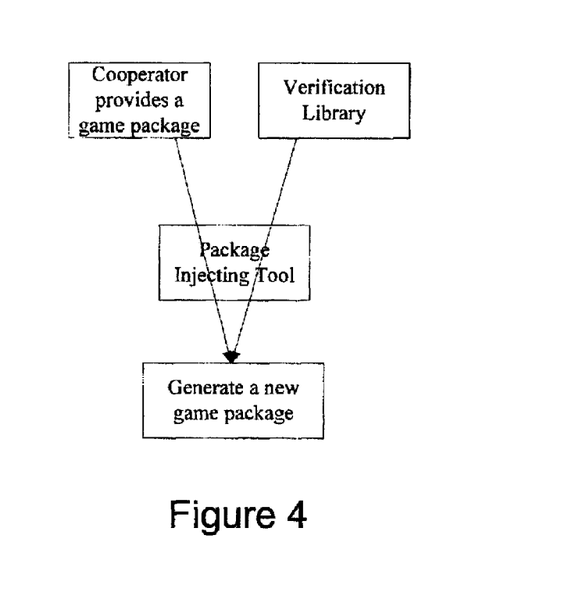
FIG. 4 is a schematic diagram illustrating a general method procedure according to an embodiment of the present invention.

Now, the procedure of the method provided by the embodiment of the present invention is finished. A uniformly distributed game package when the QQ service is combined with the online game service is generated. The operations in the above procedure are shown in FIG. 4. As shown in FIG. 4, a new game package is generated by a package injecting tool according to the game package provided by the cooperator and the verification library, wherein the verification library is the aforementioned Lib library, the package injecting tool is the aforementioned game package injecting apparatus. In the above procedure, the jar packages of the cooperator and the Lib library have been embedded to each other. They are not simply executed in series. Therefore, when the user runs the game package formed by combining the jar package and the Lib library provided by the cooperator, there is just one millet. The detailed running process of the game package is as follows: running the game program, executing the reset start function StartApp( ) automatically calling the startQQVerifyLogin( ) in the Lib library to execute user identity verification operation, so as to ensure operation security, after the identity verification succeeds, calling the startQQGame( ) to return to the game program. In particular, the startQQGame( ) automatically calls the newly created assistant start function StartAppOld( ) to turn to execute the StartAppOld( ) i.e., the detailed game program. During the execution of the game program, if a payment-related function is encountered, the corresponding payment-related interface in the Lib library will be called automatically to execute the payment operation.

It can be seen from the above that, through the method provided by the embodiment of the present invention, it is possible to implement automatic verification and payment during runtime of the game, so as to enhance the interaction between the game provided by the cooperator and the verification and payment functions in the instant messaging service. In addition, it ensures the operation security, simplifies user's operation dramatically and reduces developing and test workload.

The above method provided by the embodiment of the present invention may be applied to the game package generating system shown in FIG. 3. The game package injecting apparatus (i.e., the package injecting tool shown in FIG. 4) may adopt the structure as shown in FIG. 5 or the structure shown in FIG. 2.

Figure 5:
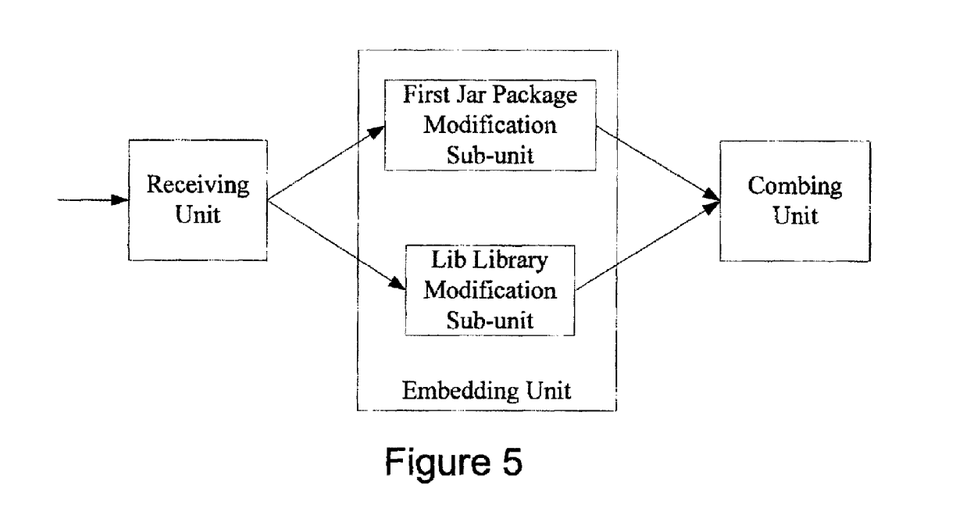
FIG. 5 is a schematic diagram illustrating a detailed structure of a game package injecting apparatus according to an embodiment of the present invention.

The structure of the game package injecting apparatus shown in FIG. 5 is similar to that shown in FIG. 2. The difference relies in that, the embedding unit specifically includes a first jar package modification sub-unit and a function library modification sub-unit (also referred to as a Lib library modification sub-unit in this embodiment).

In the apparatus shown in FIG. 5, the receiving unit is adapted to receive a Lib library in which a payment-related interface and a login verification interface are pre-configured and receive a first jar package of a game program provided by the cooperator, provide the first jar package to the first jar package modification sub-unit in the embedding unit, and provide the Lib library to the Lib library modification sub-unit in the embedding unit, wherein the Lib library provides the login verification interface and a pre-configured payment-related interface.

The first jar package modification sub-unit in the embedding unit is adapted to reset a start function in the first jar package received from the receiving unit as to call the login verification interface provided by the Lib library, create a new assistant start function in the first jar package for saving the content of the start function before the start function is reset, configure a payment-related function in the first jar package as to call the payment-related interface, and provide the modified first jar package to the combining unit.

The Lib library modification sub-unit in the embedding unit is adapted to configure an interface in the Lib library received from the receiving unit, the interface being used for calling the start function in the first jar package, as to call the assistant start function in the first jar package, and provide the modified Lib library to the combining unit.

The combining unit is adapted to combine the first jar package modified by the first jar package modification sub-unit with the Lib library modified by the Lib library modification sub-unit to form a second jar package, and modify an attribute in the second jar package which originally belongs to the first jar package according to the second jar package, so that the value of the attribute in the second jar package which originally belongs to the first jar package can reflect the attribute of the second jar package.

Figure 6:
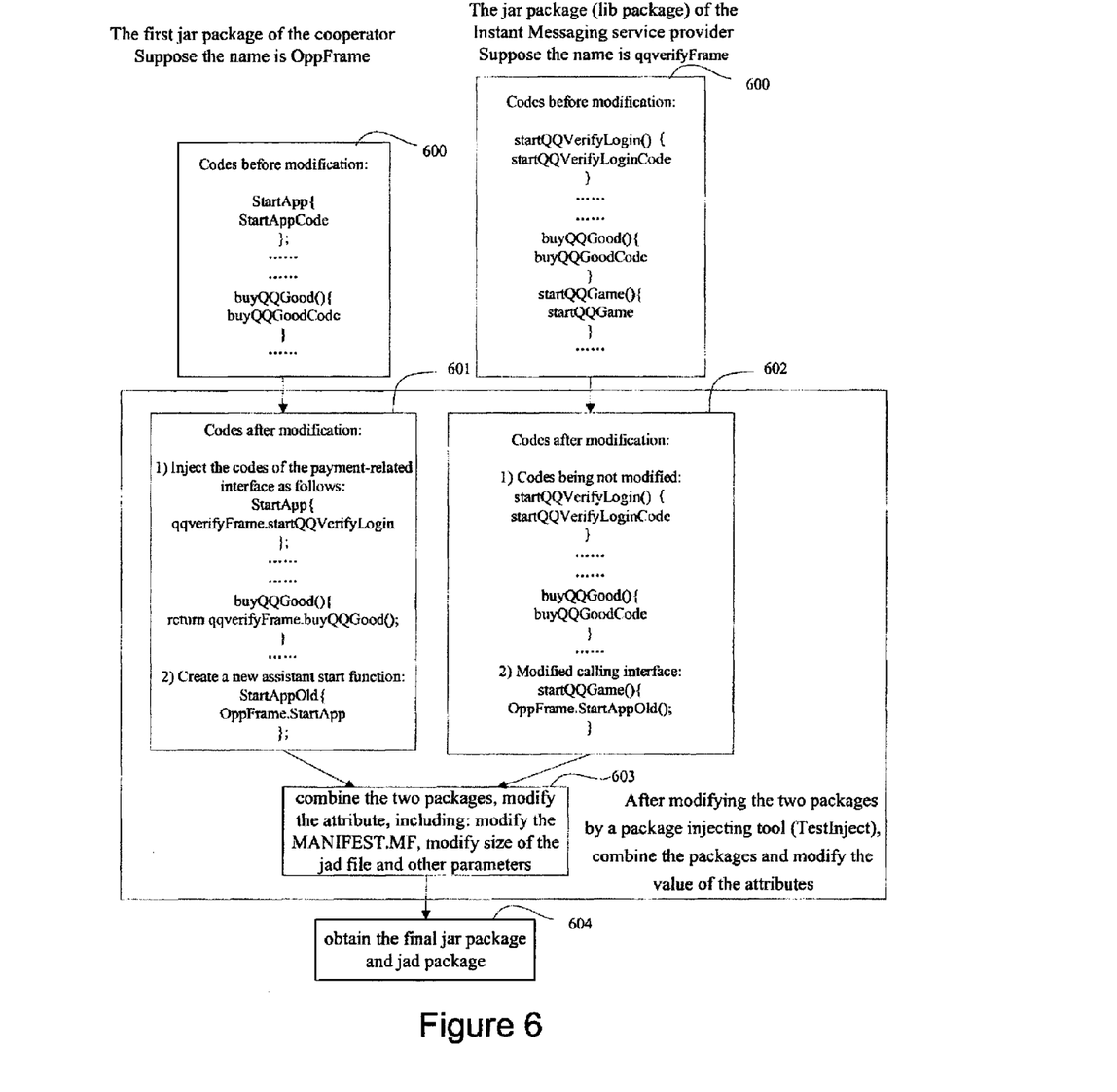
FIG. 6 is a flowchart illustrating the combination and modification of the jar packages according to an embodiment of the present invention.

For better understanding of the combination and modification of the cooperator's jar package and the Lib library provided by the embodiments of the present invention, FIG. 6 shows an example. But the combination and modification manner of the cooperator's jar package and the Lib library provided by the present invention are not limited to this. FIG. 6 shows a flowchart of combination and modification of an jar package according to an embodiment of the present invention. As shown in FIG. 6, it includes the following steps:

Step 600 shows code instances of the first jar package (named as OppFrame) of the cooperator and the jar package (also referred to as Lib package, named as qqverifyFrame) of the instant service provider at the initial state, including:

1. Codes before the payment-related interface is injected into the OppFrame package:

```
StartApp{
StartAppCode
};
...
...
buyQQGood( ){
buyQQGoodCode
}
...
```

2. Codes before the qqverifyFrame is modified:

```
startQQVerifyLogin( ) {
startQQVerifyLoginCode
}
...
...
buyQQGood( ){
buyQQGoodCode
}
startQQGame( ){
startQQGame
}
```

Step 601 shows the codes in the OppFrame package after the payment-related interface is injected in the OppFrame package and after an assistant start function is created, including:

1. The codes after the payment-related interface is injected therein:

```
StartApp{
qqverifyFrame.startQQVerifyLogin
};
...
...
buyQQGood( ){
return qqverifyFrame.buyQQGood( );
}
```

2. Create the new assistant start function:

```
StartAppOld{
OppFrame.StartApp
};
```

Step 602 shows the codes after the calling interface in the qqverifyFrame package is modified, including:
1. The unmodified codes:

```
startQQVerifyLogin( ) {
startQQVerifyLoginCode
}
...
...
buyQQGood( ){
buyQQGoodCode
}
```

2. The modified calling interface:

```
startQQGame( ){
OppFrame.StartAppOld( );
}
```

In Step 603, after the OppFrame package shown in Step 601 is combined with the qqverifyFrame package shown in Step 602, modify the value of the attribute of the package formed by the combination according to the attribute of this newly-formed jar package via the combination, the attribute being modified originally belonging to the OppFrame package, where, the modification includes: modifying MANIFEST.MF, modifying the size of the jad file and other parameters etc., such that the modified attribute's value can reflect the attribute of the jar package formed via the combination.

Herein, Steps 601 to 603 may be performed by a package injecting tool, Test Inject.

In Step 604, the jar package and the jad package which are capable of implementing automatic verification and payment in the online game are finally obtained.

The foregoing descriptions are only preferred embodiments of this invention and are not for use in limiting the protection scope thereof. Any changes and modifications can be made by those skilled in the art without departing from the spirit of this invention and therefore should be covered within the protection scope as set by the appended claims.

The invention claimed is:

1. An apparatus for injecting an application program comprising: a processor configured to provide a receiving unit, an embedding unit and a combining unit;
wherein the receiving unit is configured to receive a function library and a first jar package, and the receiving unit is further configured to provide the function library and the first jar package to the embedding unit, wherein the first jar package contains a content service program provided by a content service provider, and wherein the function library includes a payment-related interface and a login verification interface of an instant messaging service; wherein the payment-related interface is pre-configured between the content service provider and the instant messaging service provider;
the embedding unit is configured to modify the first jar package and the function library, wherein the modification comprises (i) injecting the login verification interface and the payment-related interface into the first jar package, and (ii) configuring the login verification interface as to be called before the content service program is executed, the embedding unit is further configured to provide the first jar package which has been modified by the embedding unit and the function library which has been modified by the embedding unit to the combining unit; and the combining unit is configured to combine the first jar package which has been modified by the embedding unit and the function library which has been modified by the embedding unit to form a second jar package, and to modify a value of an attribute which is in the second jar package and which originally belongs to the first jar package to make the value of the attribute which has been modified by the combining unit reflect a corresponding attribute of the second jar package.

2. The apparatus of claim 1, wherein the embedding unit comprises a first-jar-package-modification-sub-unit and a function-library-modification-sub-unit; wherein the first-jar-package-modification-sub-unit is configured to reset a start function for calling the content service program in the first jar package as to call the login verification interface, to create a new assistant start function in the first jar package for calling the content service program, to configure a payment-related function in the first jar package as to call the payment-related interface, and to provide the first jar package which has been modified by the embedding unit to the combining unit; and the function-library-modification-sub-unit is configured to modify a function for calling the start function in the function library as to call the assistant start function, and the function-library-modification-sub-unit is further configured to provide the function library which has been modified by the function-library-modification-sub-unit to the combining unit.

3. A system for generating an application program comprising: a content service program providing apparatus, a function library providing apparatus and an apparatus for injecting an application program; wherein the content service program providing apparatus is configured to generate a first jar package containing a content service program provided by a content service provider, and to provide the first jar package to the apparatus for injecting the application program; the function library providing apparatus is configured to pre-configure a payment-related interface between the content service provider and an instant messaging service provider, and to generate a function library, wherein the function library includes a payment-related interface and a login verification interface of the instant messaging service; and the apparatus for injecting the application program is configured to modify the first jar package from the content service program providing apparatus of the content provider and the function library from the function library providing apparatus, wherein the modification comprises (i) injecting the login verification interface and the payment-related interface included by the function library into the first jar package, (ii) configuring the login verification interface as to be called before the content service program is executed, (iii) combining the modified first jar package and the modified function library to form a second jar package, and (iv) modifying a value of an attribute in the second jar package which originally belongs to the first jar package to make the modified value of the attribute reflect a corresponding attribute of the second jar package.

4. The system of claim 3, wherein the apparatus for injecting the application program comprises: a processor configured to provide a receiving unit, an embedding unit and a combining unit; wherein the receiving unit is configured to receive the function library from the function library providing apparatus and the first jar package from the content service program providing apparatus, and to provide the function library and the first jar package to the embedding unit;
the embedding unit is configured to modify the first jar package and the function library from the receiving unit, and provide the modified first jar package and the modified function library to the combining unit; and the combining unit is configured to combine the modified first jar package and the modified function library received from the embedding unit to form a second jar package, and to modify a value of an attribute in the second jar package which originally belongs to the first jar package to make the modified value of the attribute reflect a corresponding attribute of the second jar package.

* * * * *